US010193631B1

(12) United States Patent
Chen et al.

(10) Patent No.: US 10,193,631 B1
(45) Date of Patent: Jan. 29, 2019

(54) OPTICAL MODULE AND CIRCUIT AND METHOD TO CONTROL THE SAME

(71) Applicants: ACCELINK TECHNOLOGIES CO., LTD., Hubei (CN); WUHAN TELECOMMUNICATION DEVICES CO., LTD, Hubei (CN)

(72) Inventors: Long Chen, Hubei (CN); Fanrong Gao, Hubei (CN); Jun Zhang, Hubei (CN); Xianghong Yu, Hubei (CN)

(73) Assignees: Accelink Technologies Co., Ltd., Hubei (CN); Wuhan Telecommunication Devices Co., Ltd, Hubei (CN)

( * ) Notice: Subject to any disclaimer, the term of this patent is extended or adjusted under 35 U.S.C. 154(b) by 0 days.

(21) Appl. No.: 15/850,295

(22) Filed: Dec. 21, 2017

(30) Foreign Application Priority Data

Sep. 15, 2017 (CN) .......................... 2017 1 0832513

(51) Int. Cl.
  *H04B 10/43* (2013.01)
  *H04B 10/03* (2013.01)
  (Continued)

(52) U.S. Cl.
  CPC .......... *H04B 10/43* (2013.01); *G06F 3/0622* (2013.01); *G06F 3/0659* (2013.01);
  (Continued)

(58) Field of Classification Search
  CPC .. H04B 10/43; H04B 10/03; H04B 10/07955; H04B 10/0797; G06F 13/4282;
  (Continued)

(56) References Cited

U.S. PATENT DOCUMENTS

| 7,079,775 B2 | 7/2006 | Aronson et al. |
| 7,184,668 B2 | 2/2007 | Aronson et al. |

(Continued)

FOREIGN PATENT DOCUMENTS

| CN | 1976261 | 6/2007 |
| CN | 102420662 | 4/2012 |
| CN | 102420663 | 4/2012 |

OTHER PUBLICATIONS

SFF Committee, "SFF-8472 Specification for Diagnostic Monitoring Interface for Optical Transceivers", Rev 10.2, Jun. 1, 2007, 36 pages.

(Continued)

*Primary Examiner* — Leslie C Pascal
(74) *Attorney, Agent, or Firm* — Vierra Magen Marcus LLP (57) ABSTRACT

The present disclosure relates to an optical module having digital diagnostic monitoring functions and a circuit and method to control the optical module. In an embodiment, a control circuit for an optical module including an optical receiving unit and an optical transmitting unit may comprise a first memory for storing a plurality of configuration parameters at predefined locations within the first memory, a second memory for storing a plurality of variables at dynamically allocated locations of the second memory, the plurality of variables including variables corresponding to a current operation status of the optical module, and an analog-to-digital converter configured to receive an analog signal corresponding to the current operation status and convert the analog signal to a digital value to be stored as the variable corresponding to the current operation status in the dynamically allocated location of the second memory.

18 Claims, 4 Drawing Sheets

(51) Int. Cl.
  *H04B 10/079*    (2013.01)
  *G06F 13/42*     (2006.01)
  *G06F 3/06*      (2006.01)
  *G06F 12/1081*   (2016.01)

(52) U.S. Cl.
  CPC ...... G06F 12/1081 (2013.01); G06F 13/4282 (2013.01); H04B 10/03 (2013.01); H04B 10/07955 (2013.01); *G06F 2212/656* (2013.01); *G06F 2213/0016* (2013.01); *H04B 10/0797* (2013.01)

(58) Field of Classification Search
  CPC .. G06F 12/1081; G06F 3/0659; G06F 3/0622; G06F 2213/0016; G06F 2212/656
  See application file for complete search history.

(56) References Cited

U.S. PATENT DOCUMENTS

| | | | | |
|---|---|---|---|---|
| 2004/0105679 | A1* | 6/2004 | Aronson | G01M 11/00 398/136 |
| 2012/0243875 | A1* | 9/2012 | Rope | H04B 10/40 398/135 |
| 2013/0209090 | A1 | 8/2013 | Rope | |

OTHER PUBLICATIONS

Chinese Office Action dated Sep. 20, 2018, Chinese Patent Application No. 201710832513.2.

\* cited by examiner

OPTICAL MODULE AND CIRCUIT AND METHOD TO CONTROL THE SAME

TECHNICAL FIELD

The present disclosure generally relates to the field of optical communication and, more particularly, to an optical module having digital diagnostic monitoring (DDM) function and a circuit and method to control the optical module.

BACKGROUND

Optical modules are critical components of a modern optical communication system, which generally include optical receiver modules, optical transmitter modules, optical transceiver modules, optical transponder modules and the like. As a typical example of the optical modules, the optical transceiver module, also referred to as an optical transceiver, generally includes an optical transmitting unit, an optical receiving unit, and a control circuit. With development of the optical communication technologies, most of the optical modules now have a digital diagnostic monitoring (DDM) function in order for the system to monitor and control operation state of the optical transmitting unit and the optical receiving unit of the optical module in real time and, in response to the operation status, take necessary measures to ensure the normal and stable operation of the communication system.

At present, there are many international standards that define specific details of the digital diagnostic monitoring function for various optical modules, such as SFF-8472 standard, SFF-8077i standard, SFF-8436 standard and the like. Among such standards, an I2C bus is adopted, which is a two-wire serial interface protocol and has slave addresses A0 and A2 corresponding to two EEPROM memories. Each EEPROM memory has an address space of 256 bytes, i.e., from 0x00 to 0xFF. A memory map for each EEPROM memory has been defined in a related international standard, which sets forth a detailed specification for each of the bytes 0-255. Taking the SFF-8472 standard as an example, the memory map for the A0 and A2 memory as defined in the standard is shown in the below Table 1. As shown, the bytes 0-127 of the slave address A0 are used to store identity information and parameters of the optical module, which are generally read-only, i.e., fixed or constant during operation of the optical module. The bytes 0-127 of the slave address A2 are used to store digital diagnostic and monitoring data, in which bytes 0-55 relate to alarming and warning thresholds, bytes 56-95 relate to calibration factors, and bytes 96-119 relate to real-time diagnostic data and state and control data.

With wide applications and performance improvements of the optical modules, the traditional memory map cannot meet requirements of current applications. Accordingly, the SFF-8472 standard has upgraded the memory map by introducing a concept of extension tables (also referred to as extension pages). In particular, the byte 127 of the slave address A2 is defined as a table selection byte, which can be used to select at most $2^8=256$ tables, and each table has a size of 128 bytes. Depending on the value of the byte 127, tables 0-255 can be selectively mapped to the memory addresses 128-255 of the slave address A2.

TABLE 1

| 2 wire Address 1010000X (A0h) | | 2 wire Address 1010001X(A2h) | |
|---|---|---|---|
| Data Address | Description | Data Address | Description |
| 0-95 | Serial ID defined by SFP MSA (96 bytes) | 0-55 | Alarming and warning thresholds (56 bytes) |
| | | 56-95 | Calibration factors (40 bytes) |
| 96-127 | Vendor Specific (32 bytes) | 96-119 | Real-time Diagnosis Interface (24 bytes) |
| | | 120-127 | Vendor Specific (8 bytes) |
| 128-255 | Reserved, SFF8079 (128 bytes) | 128-247 | User Writable EEPROM (120 bytes) |
| | | 248-255 | Vendor Specific (8 bytes) |

SUMMARY

As discussed above, in a conventional optical module with a DDM function, data is stored at predefined locations in the EEPROM so that a host can directly access the predefined locations in the EEPROM through the I2C interface to carry out desired reading and writing operations. However, such a configuration has many disadvantages. For example, with continuous increasing of data transmission rate, the I2C interface in the optical module often operates at a fast mode of 400 kHz, which requires a quick access to A0 and A2 data. In such a case, the A0 and A2 data are preferably stored in a random access memory (RAM) that has a higher access rate than a non-volatile memory such as flash or EEPROM that has a lower access rate. In addition, the non-volatile memory has limited access capability, and frequent read and write operations may affect its service lifetime.

In order to comply with related international standards such as SFF-8472, it usually needs to predefine or allocate a predetermined size of consecutive space in the memory to store the A0 and A2 data as defined in SFF-8472, and the data should be stored in the memory in the exactly same order as defined in the memory map of the international standard SFF-8472. As such, when the host requests access to a certain data address as predefined in the SFF-8472 through the I2C interface, it may easily access a corresponding address in the memory, thereby implementing operation on the data simply and quickly.

For earlier versions of the SFF-8472 standard, the above implementation is desirable as only 512 bytes of RAM space is needed to store the data for the slave addresses A0 and A2. However, as the SFF-8472 standard has been updated and the concept of extension tables/pages has been introduced, the RAM space needed for storing the A0 and A2 data also increases. Considering a RAM space for running a control program, it generally requires more than 2 k bytes of RAM space to satisfy functional requirements, which inevitably increases the cost of the optical module. Especially when a micro control unit (MCU) is used to implement at least a part of a control circuit in the optical module, as the price of the MCU usually depends on the size of its built-in RAM space, using a MCU with a larger RAM space for the optical module may increase the cost significantly.

In view of the above problems, the present disclosure proposes a circuit and method to control an optical module, and an optical module using the circuit and method. The control circuit and method of the present disclosure can accomplish all functions of the related international standards with a smaller RAM space, which can reduce the cost of the optical module without compromising of functionality of the optical module.

The inventors found that data such as A0 and A2 data as defined in the related international standards in the art may be generally classified into two categories. The first category includes data that are constant during operation of the optical module, for example, the ID and vendor related information of the optical module, configuration parameters such as thresholds, calibration factors and the like. The second category includes data that frequently change during operation of the optical module, such as the operation state data of the optical module and the like. In the present disclosure, data are stored in different memories according to characteristics of the data. For example, the first category of data may be stored in a non-volatile memory such as a flash and a read only memory (ROM) (for example, EEPROM), while the second category of data may be stored in a random access memory (RAM). By doing so, the size of the RAM needed and thus the cost may be reduced.

Since data are stored in predefined consecutive locations as defined in the related international standards such as SFF-8472, the host issues access requests relating to the predefined locations. In order to satisfy the international standards, the present disclosure also provides an access control unit to control access of the host. The access control unit can analyze the access address provided by the host and direct the host to access a non-volatile memory or a random access memory. Thus, from the host's perspective, it has accessed the specified memory locations and the related international standards are statisfied.

The inventors also found that if particular locations are predefined (or allocated) within the random access memory to store for example operation status data of the optical module as in the prior art, as the control program for the optical module running in the RAM may frequently write in the RAM, the predefined memory locations allocated for the operation status data may be overwritten with unintentional data, leading to a so called memory overflow problem. In order to avoid this problem, in the present disclosure, the operation status data are stored as values of variables in the RAM. Variables are stored in addresses of the RAM that are dynamically allocated during execution of the program, and for plural times of execution of the program, the memory address dynamically allocated for the same variable may be different from each other. In order to meet the related international standards, in the present disclosure, the access control unit may map the host access address corresponding to the RAM to a corresponding variable, rather than the predefined address within the RAM. By operating on variables rather than operating directly on predefined memory address, the aforementioned memory overflow problem may be reduced or avoided.

An aspect of the present disclosure provides a control circuit for an optical module including an optical receiving unit and an optical transmitting unit. The control circuit may comprise a first memory for storing a plurality of configuration parameters of the optical module at predefined locations within the first memory, a second memory for storing a plurality of variables at dynamically allocated locations of the second memory, the plurality of variables comprising variables corresponding to a current operation status of the optical module, and an analog-to-digital converter configured to receive analog signals corresponding to the current operation status of the optical module and to convert the analog signals into digital values to be stored as the variables corresponding to the current operation status of the optical module in the dynamically allocated locations of the second memory. The first memory may be a non-volatile memory, and the second memory may be a random access memory.

In some exemplary embodiments, the control circuit may further comprise an interface configured to communicate with a host to receive an access request including an access address from the host, and an access control unit configured to control the access of the host. When the access address is within a first range, the access control unit maps the access address to one of the predefined locations within the first memory so that the host directly accesses the one of the predefined locations of the first memory. When the access address is within a second range different from the first range, the access control unit allows the host to access one of the variables corresponding to the access address sot hat a value of the one of the variables stored in the dynamically allocated locations within the second memory is accessed. The interface may be an I2C interface, and the access address included in the access request may be a data address as defined in the SFF-8472 standard.

Another aspect of the present disclosure provides an optical module comprising an optical receiving unit, an optical transmitting unit, and a control circuit for controlling the optical receiving unit and the optical transmitting unit. The control circuit may comprise a first memory for storing a plurality of configuration parameters of the optical module at predefined locations within the first memory, a second memory for storing a plurality of variables at dynamically allocated locations of the second memory, the plurality of variables comprising variables corresponding to a current operation status of the optical module, and an analog-to-digital converter configured to receive analog signals corresponding to the current operation status of the optical module and to convert the analog signals into digital values to be stored as the variables corresponding to the current operation status of the optical module in the dynamically allocated locations of the second memory. The first memory may be a non-volatile memory, and the second memory may be a random access memory.

In some exemplary embodiments, the control circuit may further comprise an interface configured to communicate with a host to receive an access request including an access address from the host, and an access control unit configured to control the access of the host. When the access address is within a first range, the access control unit maps the access address to one of the predefined locations within the first memory so that the host directly accesses the one of the predefined locations of the first memory. When the access address is within a second range different from the first range, the access control unit allows the host to access one of the variables corresponding to the access address so that a value of the one of the variables stored in the dynamically allocated locations within the second memory is accessed. The interface may be an I2C interface, and the access address included in the access request may be a data address as defined in the SFF-8472 standard.

Yet another aspect of the present disclosure provides a method for controlling an optical module comprising an optical receiving unit and an optical transmitting unit. The method may comprise receiving analog signal corresponding to an operation status of the optical module, converting the analog signals into digital values, and storing the digital values as values of variables corresponding to the current operation status of the optical module into dynamically allocated locations of a second memory, receiving an access request including an access address from a host, analyzing the access address and, when the access address is within a first range, mapping the access address to one of predefined locations within a first memory where a plurality of configuration parameters of the optical module are stored so that the host directly accesses the one of the predefined locations of the first memory, and when the access address is within a second range different from the first range, allowing the host to access one of the variables corresponding to the access address so that a value of the one of the variables stored in the dynamically allocated locations of the second memory is accessed.

In some exemplary embodiments, the method may further comprise comparing a value of one of the variables corresponding to the current operation status of the optical module with a predetermined threshold to generate a flag value, and storing the flag value as a warning and alarm flag variable in one of the dynamically allocated locations of the second memory. The predetermined threshold may be stored as one of the configuration parameters of the optical module to one of the predefined locations of the first memory.

The above and other features and advantages of the present disclosure will be apparent from the following description to exemplary embodiments when taken in conjunction with the drawings.

DESCRIPTION OF EMBODIMENT

Hereinafter, exemplary embodiments of the present disclosure are described with reference to the accompanying drawings.

Figure 1:
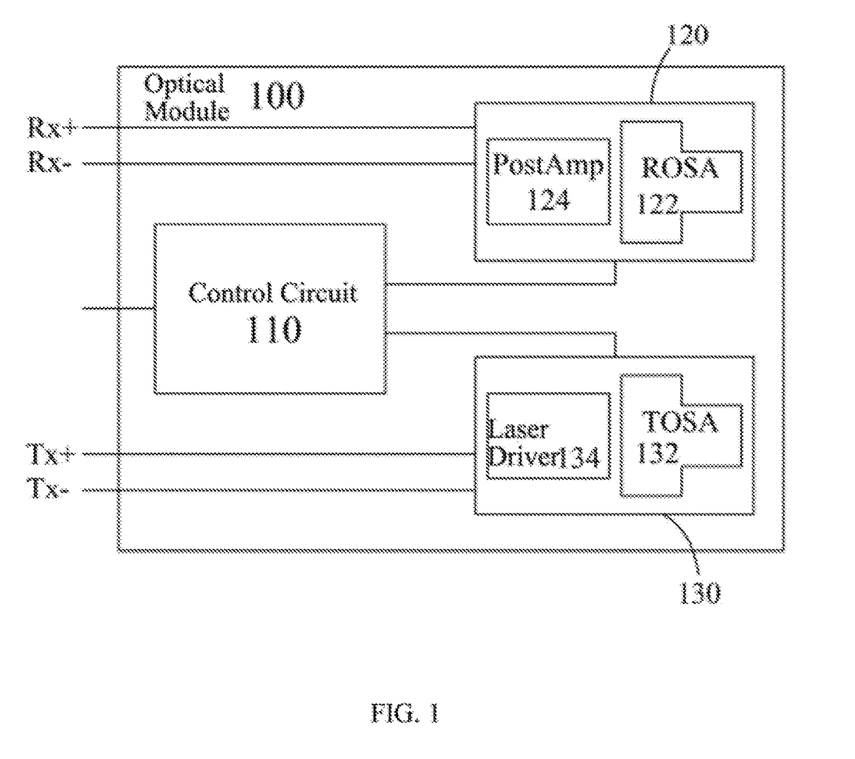
FIG. 1 is a block diagram showing an optical module according to an exemplary embodiment of the present disclosure.

FIG. 1 is a block diagram showing an optical module 100 according to an exemplary embodiment of the present disclosure. As shown in FIG. 1, the optical module 100 may include an optical receiving unit 120, an optical transmitting unit 130, and a control circuit 110 for controlling the optical receiving unit 120 and the optical transmitting unit 130.

The optical receiving unit 120 may receive an optical signal from an input optical fiber (not illustrated), convert the optical signal into an electrical signal, process (e.g., amplify) the electrical signal, and provide the amplified electrical signal to a host (not illustrated) on pins Rx+ and Rx−. As shown in FIG. 1, the optical receiving unit 120 may include an optical receiving subassembly (ROSA) 122 and a post-amplifier (PostAmp) circuit 124. The ROSA 122 may include a mechanical fiber receptacle for receiving the fiber and a photoelectric conversion element such as a photodiode for converting the optical signal received from the fiber into the electric signal. The ROSA 122 may further include a preamplifier that amplifies the electrical signal. The ROSA 122 outputs the pre-amplified electrical signal, which is an analog signal and may be provided to the post-amplifier 124. The post-amplifier 124 may generate a digital signal having a fixed amplitude and provide the digital signal to an external circuit at the pins Rx+ and Rx−. In addition, the ROSA 122 may also provide the electrical signal to the control circuit 110 to monitor the received optical power. The post-amplifier 124 may also generate a LOS (Loss of Signal) signal indicating whether the input optical signal has a sufficient intensity. The LOS signal is a digital signal and may be also provided to the control circuit 110.

The optical transmitting unit 130 may transmit an optical signal based on the electrical signal received at pins Tx+ and Tx−. The optical transmitting unit 130 may include an optical transmitting subassembly (TOSA) 132 and a laser driver circuit 134. The TOSA 132 may include a mechanical fiber receptacle for receiving an optical fiber, a laser diode or LED for emitting the optical signal, and a backlight diode for monitoring the transmitting optical power. The laser driver circuit 134 may provide an AC modulation current and a DC bias current for the laser diode, and the AC modulation current is generated based on the signal received at the pins Tx+ and Tx−. The optical transmitting unit 130 may also provide the bias current signal and the transmitting optical power signal to the control circuit 110 in order to implement the digital diagnostic monitoring (DDM) functions as described later.

The control circuit 110 is connected to the optical receiving unit 120 and the optical transmitting unit 130, and to a host (not illustrated), so as to implement the DDM functions described below in detail. The configuration of the control circuit 110 will be described below in detail with reference to FIG. 2.

Figure 2:
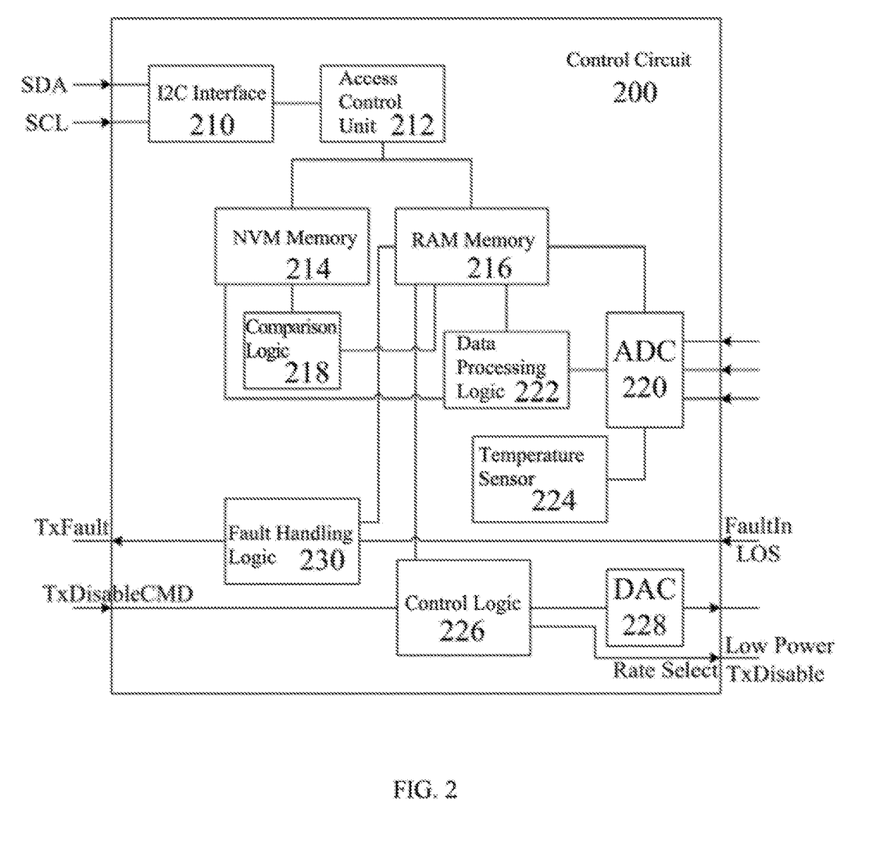
FIG. 2 is a block diagram showing a control circuit for an optical module according to an exemplary embodiment of the present disclosure.

FIG. 2 is a block diagram showing a control circuit 200 for an optical module according to an exemplary embodiment of the present disclosure. The control circuit 200 may communicate with the host device, and with the optical receiving unit 120 and the optical transmitting unit 130 of the optical module 100, so as to implement various digital diagnostic monitoring (DDM) functions. The control circuit 200 may include an interface unit 210 for communication with the host device. The interface unit 210 for communication with the host may be any common interface used in various optical modules, such as, but not limited to, an I2C (also be referred to as IIC) interface and the like. The I2C interface is a two-wire serial interface, of which detailed information may be found in "UM 10204 I2C-bus specification and user manual", Rev. 6, 4 Apr. 2014. A detailed description thereof will not be repeated here.

The control circuit 200 may further include an analog to digital converter (ADC) circuit 220 in communication with the optical receiving unit 120 and the optical transmitting unit 130 of the optical module 100 so as to receive analog signals from the optical receiving unit 120 and the optical transmitting unit 130 corresponding to current operation status of the units 120, 130. For example, the ADC 220 may receive the received optical power signal from the optical receiving unit 120, the transmitting optical power signal and the bias current signal from the optical transmitting unit 130, and so on. The ADC 220 may further receive a supply voltage signal of the optical module 100, a temperature signal from a temperature sensor 224, and so on. The temperature sensor 224, which senses the temperature of the optical module 100, may be implemented within the control circuit 200 or outside the control circuit 200, for example, adjacent to the optical receiving unit 120 and the optical transmitting unit 130. The ACD 220 may convert the received analog signals corresponding to the current operation status of the optical module 100 into digital values and stores the digital values into a memory as described below.

In an exemplary embodiment of the present disclosure, the control circuit 200 may include at least two memories, i.e., a first non-volatile (NVM) memory 214 and a second random access memory (RAM) 216. The first NVM memory 214 may be a read-only memory, such as a flash memory, an EEPROM memory or the like, which can maintain data after power off but has slower read and write speed and a limited writable life. The second RAM memory 216 is a volatile memory that loses data upon power off but it has a faster read and write speed and an almost unlimited read and write life. For example, the second RAM memory 126 may be implemented as SDRAM, DRAM, DDR and so on. Various data required for the DDM functions, for example, those data defined in standards such as SFF-8472, SFF-8077i, SFF-8436 and the like, may be stored in the first memory 214 and the second memory 216, respectively. For convenience and clarity of description, the SFF-8472 standard will be taken as an example for the following explanation. However, it will be understood that the principle of the present disclosure may also be applied to other standards and related optical modules.

The above Table 1 shows data as defined in the SFF-8472 standard. In an exemplary embodiment of the present disclosure, some of the data that remain unchanged during operation of the optical module, such as those relating to ID and vendor information or the like of the optical module defined in the data addresses 0-255 of the slave address A0, and various configuration parameters such as thresholds and calibration factors or the like of the optical module defined in the data addresses 0-95 of the slave address A2, may be stored in the first non-volatile memory 214. Such data are generally set by the manufacturer during fabrication of the optical module and will not change during operation of the optical module. The data that are frequently updated or changed during operation of the optical module, such as the operation status data of the optical module defined in the data addresses 96-127 of the slave address A2 which may be obtained directly or indirectly from the ADC circuit 220, may be stored in the second RAM memory 216. The data in tables or pages defined in the data addresses 128-255 of the slave address A2 may be stored in the first NVM memory 214 or the second RAM memory 216 depending on their characteristics such as whether they are frequently updated.

The data stored in the first NVM memory 214 may be written into predefined locations of the first NVM memory 214 by, for example, the manufacturer during manufacture of the optical module. For example, according to definition of relevant data within the standard SFF-8472, a consecutive address space having the same length may be predefined in the first NVM memory 214, and the relevant data may be written into the consecutive address space in the order as defined by the standard SFF-8472. Table 2 shows an example in which a 96-byte consecutive address space from the address 13400 to the address 13495 is predefined in the first NVM memory 214 having a 64 k storage space (the addresses from 0 to 65535) for storing data of the data addresses 0-95 of the slave address A2 defined in SFF-8472. It will be understood that the predefined consecutive address space in the first NVM memory 214 may start from another address. When the control program tor controlling the optical module 100 is executed a plurality of times, the addresses in the first NVM memory 214 for storing these data will not change.

TABLE 2

| Data addresses of A2 defined in SFF-8472 | Actual storage addresses in First NVM Memory | Data Description |
| --- | --- | --- |
| 0-55 | 13400-13455 | Alarms and warning thresholds (56 bytes) |
| 56-95 | 13456-13495 | Calibration factors (40 bytes) |

In some embodiments, examples of configuration parameters that may be stored in the first NVM memory 214 may include but not limited to the following parameters: a temperature threshold of the optical module, a supply voltage threshold of the optical module, a bias current threshold of the optical transmitting unit, a transmitting optical power threshold of the optical transmitting unit, a received optical power threshold of the optical receiving unit, a received optical power calibration factor of the optical receiving unit, a bias current calibration factor of the optical transmitting unit, a transmitting optical power calibration factor of the optical transmitting unit, a temperature calibration factor of the optical module, and a supply voltage calibration factor of the optical module and so on.

The related data may be stored in the second RAM memory 216 in a different manner than that in the first NVM memory 214. For example, during operation of the optical module 100, the data obtained directly or indirectly from the ADC circuit 220 corresponding to the operation status of the optical module 100 may be assigned to corresponding variables by the control program, and the variables may be stored in the second RAM memory 216. It should be noted that the addresses in the second RAM memory 216 for storing the variables are dynamically allocated during execution of the control program, rather than being predefined by the program. When the program is executed a plurality of times, addresses dynamically assigned to the same variable may be different from each other. Table 3 shows an example in which the data of the data addresses 96-127 of the slave address A2 defined in the SFF-8472 standard are stored as variables in the second RAM memory 216. It will be understood that names of the variables can be arbitrarily determined without being limited to the examples given in Table 3. It will also be understood that while Table 3 shows individual variables corresponding to the respective data addresses, the variables may also be implemented as an array or structure corresponding to multiple data addresses, which should also be considered as a particular form of the variables. The data addresses reserved in SFF-8472 and not be actually used may not be stored in the second RAM memory 216.

TABLE 3

| Data addresses of A2 defined in SFF-8472 | Names of variables stored in second RAM Memory | Data Description |
| --- | --- | --- |
| 96-97 | Temperature | Detected temperature value (2 bytes) |
| 98-99 | Vcc | Supply voltage value (2 bytes) |
| 100-101 | TxBias | Detected bias current value (2 bytes) |
| 102-103 | TxPower | Detected transmitting optical power value (2 bytes) |
| 104-105 | RxPower | Detected received optical power value (2 bytes) |
| 110 | OptStatusControlBits | Optional status or control bits |

TABLE 3-continued

| Data addresses of A2 defined in SFF-8472 | Names of variables stored in second RAM Memory | Data Description |
| --- | --- | --- |
| 112-113 | AlarmFlag | Alarming Flag (2 bytes) |
| 116-117 | WarningFlag | Warning Flag (2 bytes) |
| 118 | ExtStatusControlBits | Extension status or control bits |
| 123-126 | PasswordEntry | Password entry (4 bytes) |
| 127 | TableSelect | Table/Page selection |

When the data are stored in the first NVM memory 214 and the second RAM memory 216 as described above, many advantages may be achieved. Firstly, the data are sequentially and continuously stored in the predefined locations in the first NVM memory 214 as defined in the standard SFF-8472, so that the host can conveniently access these predefined locations in the first NVM memory 214 to obtain the related data value, and thus the control program may be executed quickly and efficiently. While in the second RAM memory 216, the data are stored as values of the variables in the dynamically allocated addresses, and when receiving an access request from the host, operations may be carried out directly on the variables, which reduces the risk of memory overflow as described above which may easily occur when operation is carried out directly on the addresses, and also reduces the difficulty in programming of the control program. Moreover, when data that need to be frequently updated or written are stored in the RAM memory which has an almost infinite write lifetime, it may increase the service lifetime of the optical module. In addition as the data are stored in the first NVM memory 214 and the second RAM memory 216, respectively, the memory space needed for the RAM memory may be reduced, and thus the cost of the optical module may be reduced. Moreover, reserved addresses defined in the standards but not actually used such as bytes 119-122 of A2 defined in SFF-8472 may be ignored, and only data that are actually used may be stored as variables in the second RAM memory 216, thereby saving memory space of the RAM memory.

Some data corresponding to the operation status of the optical module 100, such as the supply voltage of the optical module, the bias current and the transmitting optical power of the optical transmitting unit, the received optical power of the optical receiving unit or the like, may be directly stored into the second RAM memory 216 after being converted into digital values by the ADC circuit 220. While same other data, after being converted into digital values by the ADC circuit 220, still need to be further processed by the data processing logic 222 to obtain the data corresponding to the operation status of the optical module 100, and then the data may be stored in the second RAM memory 216. For example, an analog electrical signal from the temperature sensor 224 such as a thermocouple may be converted into a digital current/voltage value by the ADC circuit 220 and then be further processed in the data processing logic 222. In particular, the data processing logic 222 may refer to a temperature look-up table to determine the temperature value corresponding to the digital current/voltage value. The temperature look-up table maps the digital current/voltage values to temperature values, and it may be placed in an extension table/page of the slave address A2 and be stored in the first NVM memory 214. Then, the temperature value determined by the data processing logic 222 may be stored in the second RAM memory 216.

The control circuit 200 may further include a comparison logic 218. The comparison logic 218 may compare the data corresponding to the operation status of the optical module 100 obtained directly or indirectly from the ADC circuit 220 with a corresponding threshold to generate a flag value. For example, the comparison logic 218 may compare the temperature value of the optical module 100 with an over-temperature warning threshold, an over-temperature alarming threshold, an under-temperature warning threshold, and an under-temperature alarming threshold, respectively, and generate corresponding warning or alarming flag values. Similarly, the comparison logic 218 may compare the supply voltage, the bias current and the transmitting optical power of the optical transmitting unit, the received optical power of the optical receiving unit and so on with corresponding thresholds and generate corresponding warning and alarming flag values. The warning and alarming flag values generated by the comparison logic 218 may be stored in the second RAM memory 216.

The variables stored in the second RAM memory 216 may further include data indicated by the host device (not shown), such as status control data, password entered by the user through the host device, and the like. The host may provide input data such as password through the aforementioned interface 210 or through hardware pins (not shown) of the control circuit 200.

The host may communicate with the control circuit 200 through the interface 210. The control circuit 200 may further include an access control unit 212 to control the access of the host to the control circuit 200. Next, the I2C interface will be taken as an example to describe how the host may access the control circuit 200. However, it will be understood that the principle of the present disclosure may also be applied to other interface circuits.

Figure 3A:
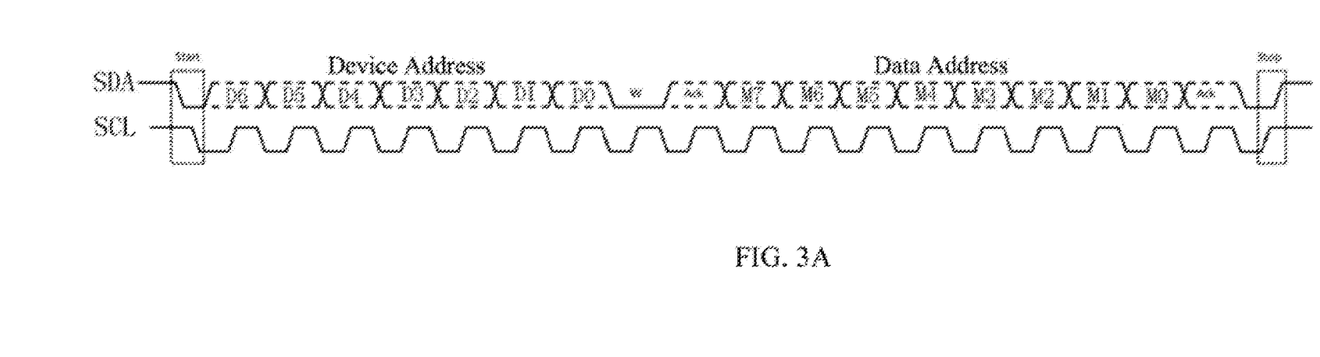
FIG. 3A and FIG. 3B are timing charts showing a read operation of an interface circuit.
Figure 3B:
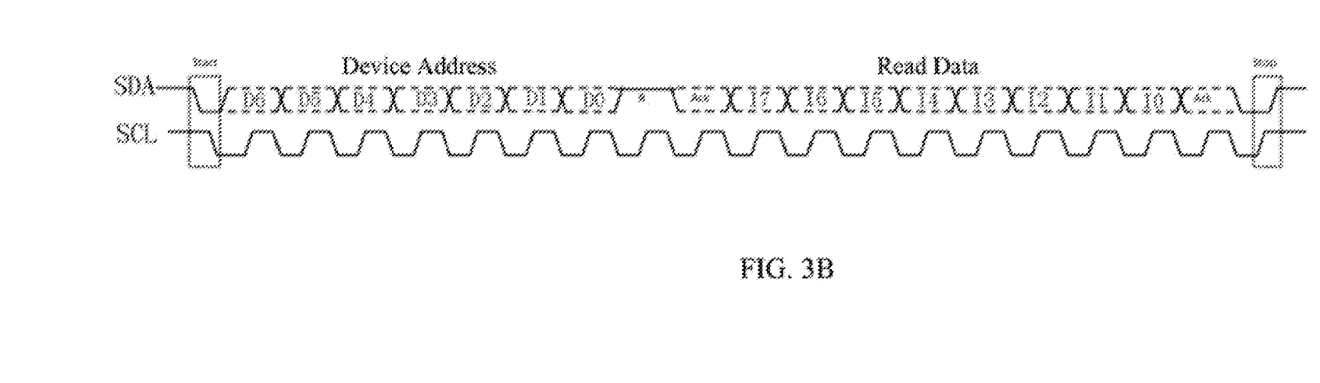

The host may send an access request to the control circuit 200 through the I2C interface 210, winch may include an address(es) to be accessed by the host. FIG. 3A and FIG. 3B show timing chart of the clock line SCL and the data line SDA of the I2C interface 210 in a read operation. As shown in FIG. 3A, a start (START) signal is followed by a 7-bit device address signal D6-D0, and the read/write (R/W) signal bit is set to a lower level representing a write signal W. For the slave address A0, the device address signal D6-D0 is 1010000 (binary), while for the slave address A2, the device address signal D6-D0 is 1010001 (binary). After an acknowledgement signal Ack, an 8-bit memory data address signal M7-M0 follows, which is the data address as defined in the related international standard, for example, the data address 0-255 (decimal) as defined in SFF-8472. Followed are the acknowledgement signal Ack and the stop (STOP) signal. It should be noted that there is no data actually written between the acknowledgement signal Ack and the stop signal, and the timing chart shown in FIG. 3A only completes a dummy write operation to load in the address to be read, i.e., the memory address M7-M0 of the device address D6-D0 (corresponding to the first seven bits of A1 or A2). If data need to be actually written, they may be inserted between the acknowledgement signal Ack and the stop signal.

Next, in the timing chart shown in FIG. 3B, the read operation is carried out. As shown in FIG. 3B, the host generates another start (START) signal, and sends the device address D6-D0. The read/write signal bit is set to a higher level, which represents a read signal R. The control circuit acknowledges (Ack) the device address and then output the data bits 17-10 stored in the previously loaded memory address. Followed are the acknowledgement signal Ack and the stop signal, thereby completing the read operation.

It can be seen from the read and write operations as described above that the access request from the host includes the address to be accessed by the host, which is an address already clearly defined in the related international standards and thus the meaning of the data stored in the address is also known. In the prior arts, the control circuit may directly access the predefined address in the memory to implement the read and write operations. Contrary to the prior arts, in the present disclosure, the access request of the host is controlled by the access control unit 212.

The access control unit 212 may control the access of the host to the optical module 100. As discussed above, the data are stored in the first NVM memory 214 and the second RAM memory 216. The access control unit 212 may analyze the access address included in the access request received from the host to access a predefined address in a memory (such as the first NVM memory) or a variable stored in another memory (such as the second RAM memory). For example, when the access address requested by the host is within a first range, such as but not limited to the data addresses 0-255 of the slave address A0 and the data addresses 0-95 of the stove address A2, the access control unit 212 maps the access address to a predefined location within the first NVM memory, and the mapping process may be implement by, for example, adding a predetermined offset to the access address. For example, in the example shown in Table 2, the access addresses 0-95 may be incremented by an offset 13400 to be mapped to the actual memory address in the first NVM memory 214 so that the host can directly access the actual address within the first NVM memory 214, thereby implementing the access operation conveniently and quickly. When the access address is within a second range different from the first range, such as but not limited to the data addresses 96-127 of the slave address A2, the access control unit 212 controls the host to access a corresponding variable that is stored in a dynamically allocated location within the second RAM memory 216.

It should be noted that, as discussed above, the data are stored at the predetermined locations in the first NVM memory 214 so that when the access control unit 212 accesses the first NVM memory 214, it may operate directly on the predetermined addresses within the first NVM memory 214. For example, the access control unit 212 may convert the address included in the access request from the host into the predetermined address within the first NVM memory 214 and then access the predetermined address within the first NVM memory 214. In the second RAM memory 216, the data are stored as variables at the dynamically allocated locations. Therefore, when the access control unit 212 accesses the second RAM memory 216, the access control unit 212 may access the corresponding variable stored in the second RAM memory 216 according to the address included in the access request from the host. Through the operations of the access control unit 212, the host can obtain the data corresponding to the access address specified by the host. Therefore, As seen from the host side, the optical module 100 including the control circuit 200 according to the above embodiments of the present disclosure complies with the related international standards such as SFF-8472.

The above discussed configuration has a plurality of advantages. First of all, the optical module with such a configuration complies with the related international standards such as SFF-8472, and thus it is compatible with the existing optical communication systems. In addition, since the data are stored at the dynamically allocated locations within the second RAM memory 216, programming of the control program may be more flexible, and it is convenient for programmers to implement some extension functions such as customized functions.

As shown in FIG. 2, the control circuit 200 may further include a control logic 226. The control logic 226 may generate a control signal according to the value of the variable stored in the second RAM memory 216 to control operations of the optical receiving unit 120 and/or the optical transmitting unit 130. In an example, the control logic 226 may generate a control signal to compensate for the modulation current of the optical transmitting unit 130 based on the value of the temperature variable. A look-up table mapping the temperature values to the modulation current compensation values may be stored in the first NVM memory 214, and the control logic 226 may refer to the look-up table to generate the modulation current compensation value corresponding to the current temperature. In other embodiments, the control logic 226 may generate a rate select control signal and a low power control signal based on such as values of a rate select variable and a low power select variable, respectively, to control operations of the optical receiving unit 120 and the optical transmitting unit 130.

The control logic 226 may also generate a control signal to control operations of the optical receiving unit 120 and the optical transmitting unit 130 according to signals received from the host. For example, the host may provide instructions through the rate selection pin, the low power selection pin, the transmission disable (Tx disalbe) pin and so on of the control circuit 200, and the control logic 226 may control the operations of the optical receiving unit 120 and the optical transmitting unit 130 according to the host instructions received on these pins.

It should be noted that the control signals generated by the control logic 226 is digital signals. Therefore, some of the digital signals such as the modulation current temperature condensation signal need to be converted to analog signals by the digital-to-analog converter (DAC) circuit 228 so that they can be applied to the optical receiving unit 120 and the optical transmitting unit 130, while some control signals such as the rate select control signal, the low power control signal, the transmission disable signal (TxDisable) and the like may be directly applied to the optical receiving unit 120 and the optical transmitting unit 130 without being converted to analog signals by the DAC circuit 228.

The control circuit 200 may further include a fault handling logic 230. The fault handling logic 230 may read the warning and alarm flag variables stored in the second RAM memory 216, and may also receive one or more fault signals generated by the optical receiving and transmitting units 120, 130 of the optical module 100, such as the fault signal FaultIn, the signal lost signal LOS and the like. The fault handling logic 230 may logically combine such flag variables and fault signals, for example, by performing a logical "OR" operation, to generate a fault signal TxFault and outputs the generated fault signal TxFault to the host. In addition, the fault handling logic 230 may also forward the fault signal received from the optical receiving and transmitting units 120, 130 such as the LOS signal directly to the host.

The control circuit 200 has been described above with reference to FIG. 2, which may be used as, for example, the control circuit 110 in the optical module 100 of FIG. 1 to implement the digital diagnostic and monitoring (DDM) functions. Next, a method 300 for controlling the operation of the optical module 100 by using the control circuit will be described with reference to FIG. 4. Since many details of the method 300 have been apparent from the above description, only a brief description of steps of the method 300 will be given below.

Figure 4:
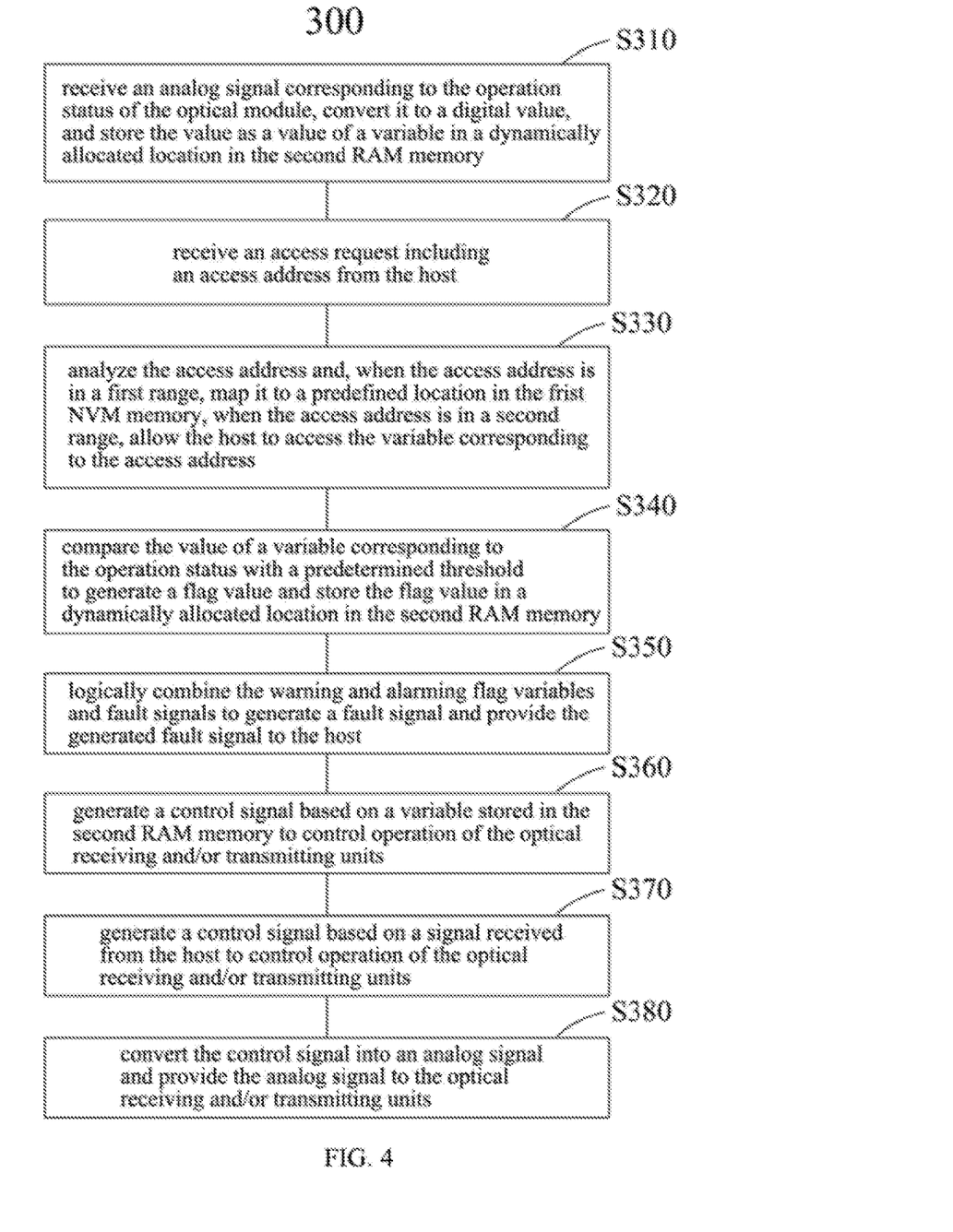
FIG. 4 is a flow chart showing a method for controlling an optical module according to an embodiment of the present disclosure.

As shown in FIG. 4, the method 300 includes a step S310 in which the analog-to-digital converter ADC circuit 220 receives an analog signal corresponding to the operation status of the optical module 100, converts the analog signal into a digital value, and store the digital value as a value of a variable corresponding to the current operation status of the optical module 100 in a dynamically allocated location of the second memory 216. In a step S320, the control circuit 200 receives an access request from the host through, for example, the interface circuit 210, and the access request may includes an access address. Next, in a step S330, the access control unit 212 analyzes the access address. For example, if the access address is within a first range, the access control unit 212 maps the access address to a corresponding predefined location within the first NVM memory 214 to enable the host to access the predefined location. As mentioned previously, a plurality of configuration parameters of the optical module may be stored in the predefined locations of the first NVM memory 214. If the access address is within a second range different from the first range, the access control unit 212 may allow the host to access the variable corresponding to the access address so as to obtain the value of the variable stored in the dynamically allocated location within the second RAM memory 216.

In some embodiments, the method 300 may further include a step S340, in which the comparison logic 218 compares the value of the variable corresponding to the current operation status of the optical module 100 with a predetermined threshold to generate a flag value, and the flag value may be stored in a dynamically allocated location of the second RAM memory 216. As mentioned above, the predetermined threshold may be stored as a configuration parameter of the optical module 100 at a predefined location of the first NVM memory 214.

In some embodiments, the method 300 may further include a step S350, in which the fault handling logic 230 may logically combine the warning and alarm flag variables and at least one fault signal generated internally in the optical module 100, for example, by performing a logical "OR" operation, to generate a fault signal, and output the generated fault signal to the host. In some embodiments, in the step S350, the fault processing logic 230 may also forward the fault signal received from the optical module 100 such as the LOS signal directly to the host.

In some embodiments, the method 300 may further include a step S360, in which the control logic 226 generates a control signal based on at least one of a plurality of variables stored in the second RAM memory to control the operation of at least one of the optical receiving unit 120 and the optical transmitting unit 130. For example, the control logic 226 may control the modulation current of the optical transmitting unit 130 based on the temperature.

In some embodiments, the method 300 may further include a step S370, in which the control logic 226 generates a control signal based on a signal received from the host to control the operation of at least one of the optical receiving unit 120 and the optical transmitting unit 130.

In a step S380, the analog-to-digital converter DAC circuit 228 may convert the control signal generated by the control logic 226 into an analog signal and provide the analog signal to at least one of the optical receiving unit 120 and the optical transmitting unit 130.

Some exemplary embodiments of the optical module and its control circuit and method have been described above. It will be understood that many changes in form and details may be made by those skilled in the art without deviating from the principles of the present disclosure. For example, the control circuit according to some embodiments may be implemented as a single-chip integrated circuit or as a plurality of discrete elements. In some embodiments, the control circuit 200 may be implemented by using an existing control chip and a micro control unit (MCU). Each block shown in the block diagram may be divided into a plurality of sub-blocks, which may be recombined as long as the principles of the present disclosure may be implemented. Although some embodiments of the present disclosure have been described taking the optical transceiver and the SFF-8472 standard as an example, it will be understood that the principle of the present disclosure may also be applied to other optical modules and related standards such as a XFP module, a QSFP+ module, a PON series module, a QSFP28 module, and the SFF-8077i standard, the SFF-8436 standard and the SFF-8636 standard.

It will also be understood that the various structural blocks of the device described above may be implemented in various forms such as hardware, software, or firmware. For example, the plurality of logic units shown in FIG. 2 may be implemented as hardware or software. The plurality of steps of the method described above may be carried out in an order different from that as described. For example, a first-described step may be carried out after a later-described step, or two or more steps may be carried out concurrently.

The principles of the preset application have been described above in conjunction with the exemplary embodiments. However it should be noted that the advantages, superiorities, and beneficial effects mentioned in the present application are merely examples but not intended to limit the present disclosure. These advantages, superiorities, and beneficial effects should not be deemed essential for each of the embodiments. In addition, the specific details of the above disclosure are only for the purpose of illustration and ease of understanding but not for limitation by any way, and the details do not means the present application has to be implemented with such specific details.

The block diagrams of device, apparatus, equipment, system referred to in the present application are merely illustrative examples and are not intended to require or imply that the connections, arrangements, and configurations must be made in the manner as shown in the block diagrams. Those skilled in the art will appreciate that the device, apparatus, equipment, and system may be connected, arranged, or configured in any manner. The words "comprise", "include", "have" and the like are to be construed in an inclusive sense, which means "include but not limited to", and they may be used interchangeably. The words "or" and "and" as used herein refer to the phase "and/or" and they may be used interchangeably; unless the context clearly dictates otherwise. The word "such as" as used herein refers to the phrase "such as but not limited to" and they may be used interchangeably.

It should also be noted that in the apparatus, equipment, and method of the present application, each component or step may be decomposed and/or recombined. These decompositions and/or recombination should be regarded as equivalents of embodiments of the present application.

The above description of the disclosed aspects is provided to enable those skilled in the art to make or use the application. Various modifications to these aspects are very obvious for those skilled in the art, and the generic principles defined herein may be applied to other aspects without departing from the scope of the application. Therefore, the present application is not intended to be limited to the aspects shown herein, but rather to present the broadest scope consistent with the principles and novel features disclosed herein.

Though the present disclosure has shown and described related specific embodiment reference in detail, those skilled in the art can understand that, various kinds of modifications can be made in form and detail without departing from the idea and range of the present disclosure, and all of these modifications fall into a range sought for protection of the claims of the present disclosure.

The invention claimed is:

1. A control circuit for an optical module including an optical receiving unit and an optical transmitting unit, the control circuit comprising:
   a first memory for storing a plurality of configuration parameters of the optical module at predefined locations within the first memory;
   a second memory for storing a plurality of variables at dynamically allocated locations of the second memory, the plurality of variables including variables corresponding to a current operation status of the optical module;
   an analog-to-digital converter configured to receive an analog signal corresponding to the current operation status of the optical module, and to convert the analog signal to a digital value to be stored as the variable corresponding to the current operation status of the optical module in the dynamically allocated location of the second memory;
   an interface configured to communicate with a host to receive an access request including an access address from the host; and
   an access control unit configured to control the access of the host, wherein when the access address is within a first range, the access control unit maps the access address to one of the predefined locations within the first memory corresponding to the access address to allow the host to directly access the one of the predefined locations of the first memory, and when the access address is within a second range different from the first range, the access control unit allows the host to access one of the variables corresponding to the access address so as to access a value of the one of the variables stored in one of the dynamically allocated locations within the second memory.

2. The control circuit of claim 1 wherein the first memory is a non-volatile memory and the second memory is a random access memory.

3. The control circuit of claim 1 wherein the configuration parameters include one or more of the following parameters: a temperature threshold of the optical module, a supply voltage threshold of the optical module, a bias current threshold of the optical transmitting unit, an transmitting optical power threshold of the optical transmitting unit, a received optical power threshold of the optical receiving unit, a received optical power calibration factor of the optical receiving unit, a bias current calibration factor of the optical transmitting unit, a transmitting optical power calibration factor of the optical transmitting unit, a temperature calibration factor of the optical module, and a supply voltage calibration factor of the optical module,
   wherein the variables corresponding to the current operation status of the optical module comprises one or more of the following variables: a temperature of the optical module, a supply voltage of the optical module, a bias current of the optical transmitting unit, a transmitting optical power of the optical transmitting unit, and a received optical power of the optical receiving unit, and wherein the plurality of variables further include one or more of the following variables: a state control variable, a warning and alarm flag variable, and a password input variable.

4. The control circuit of claim 1, wherein the interface is an I2C interface and the access address included in the access request is a data address defined in the SFF-8472 standard.

5. The control circuit of claim 1, further comprising:
   a comparison logic configured to compare a value of the variable corresponding to the current operation status of the optical module with a predetermined threshold to generate a flag value to be stored as a warning and alarm flag variable in the dynamically allocated location of the second memory, the predetermined threshold being stored as the configuration parameter of the optical module in the predefined location of the first memory.

6. The control circuit of claim 5 further comprising:
   a fault handling logic configured to logically combine the warning and alarm flag variable and at least one fault signal received from the optical module to generate a fault signal and provide the generated fault signal to the host; and
   a control logic configured to generate a control signal based on a signal received from the host or at least one of the plurality of variables stored in the second memory to control the operation of at least one of the optical receiving unit and the optical transmitting unit.

7. The control circuit of claim 6 further comprising:
   a digital-to-analog converter configured to convert the control signal into an analog signal and provide the analog signal to the at least one of the optical receiving unit and the optical transmitting unit.

8. The control circuit of claim 1 further comprising:
   a temperature sensor coupled to the analog-to-digital converter and configured to sense the temperature of the optical module.

9. An optical module comprising:
   an optical receiving unit;
   an optical transmitting unit;
   a control circuit for controlling the optical receiving unit and the optical transmitting unit, the control circuit comprising;
      a first memory for storing a plurality of configuration parameters of the optical module at predefined locations within the first memory;
      a second memory for storing a plurality of variables at dynamically allocated locations of the second memory, the plurality of variables including variables corresponding to a current operation status of the optical module; and
      an analog-to-digital converter configured to receive an analog signal corresponding to the current operation status of the optical module, and to convert the analog signal to a digital value to be stored as the variable corresponding to the current operation status of the optical module in the dynamically allocated location of the second memory;
      an interface configured to communicate with a host to receive an access request including an access address from the host; and
      an access control unit configured to control the access of the host, wherein when the access address is within a first range, the access control unit maps the access address to one of the predefined locations within the first memory corresponding to the access address to allow the host to directly access the one of the predefined locations of the first memory, and when the access address is within a second range different from the first range, the access control unit allows the host to access one of the variables corresponding to the access address so as to access a value of the one of the variables stored in one of the dynamically allocated locations within the second memory.

10. The optical module of claim 9 wherein the first memory is a non-volatile memory and the second memory is a random access memory.

11. The optical module of claim 9, wherein the interface is an I2C interface and the access address included in the access request is a data address defined in the SFF-8472 standard.

12. The optical module of claim 9, further comprising:
a comparison logic configured to compare a value of the variable corresponding to the current operation status of the optical module with a predetermined threshold to generate a flag value to be stored as a warning and alarm flag variable in the dynamically allocated location of the second memory, the predetermined threshold being stored as the configuration parameter of the optical module at the predefined location of the first memory;
a fault handling logic configured to logically combine the warning and alarm flag variable with at least one fault signal received from the optical module to generate a fault signal and output the generated fault signal to the host; and
a control logic configured to generate a control signal based on a signal received from the host or at least one of the plurality of variables stored in the second memory to control the operation of at least one of the optical receiving unit and the optical transmitting unit.

13. The optical module of claim 12 further comprising:
a digital-to-analog converter configured to convert the control signal into an analog signal and provide the analog signal to the at least one of the optical receiving unit and the optical transmitting unit.

14. A method for controlling an optical module including an optical transmitting unit and an optical receiving unit, the method comprising:

receiving an analog signal corresponding to a current operation status of the optical module, converting the analog signal into a digital value, and storing the digital value as a value of a variable corresponding to the current operation status of the optical module in a dynamically allocated location of a second memory;
receiving an access request including an access address from a host;
analyzing the access address and, when the access address is within a first range, mapping the access address to a predefined location within a first memory to allow the host to directly accesses the predefined location of the first memory, wherein a plurality of configuration parameters of the optical module are stored in respective predefined locations of the first memory, when the access address is within a second range different from the first range, allowing the host to access the variable corresponding to the access address so as to access a value of the variable stored in the dynamically allocated location within the second memory.

15. The method of claim 14 wherein the first memory is a non-volatile memory and the second memory is a random access memory.

16. The method of claim 14 further comprising:
comparing the value of the variable corresponding to the current operation status of the optical module with a predetermined threshold to generate a flag value to be stored as a warning and alarm flag variable in the dynamically allocated location of the second memory, the predetermined threshold being stored as the configuration parameter of the optical module at the predefined location of the first memory.

17. The method of claim 16 further comprising:
logically combining the warning and alarm flag variable with at least one fault signal received from the optical module to generate a fault signal and providing the generated fault signal to the host; and
generating a control signal based on a signal received from the host or at least one of the plurality of variables stored in the second memory to control the operation of at least one of the optical receiving unit and the optical transmitting unit.

18. The method of claim 17 further comprising:
converting the control signal into an analog signal and providing the analog signal to the at least one of the optical receiving unit and the optical transmitting unit.

* * * * *